(12) United States Patent
Coleman

(10) Patent No.: US 7,641,160 B2
(45) Date of Patent: *Jan. 5, 2010

(54) TRIPOD STABILIZER AND LIGHTED LENS CAROUSEL

(76) Inventor: David Harold Coleman, P.O. Box 417839, Sacramento, CA (US) 95841-7839

( * ) Notice: Subject to any disclaimer, the term of this patent is extended or adjusted under 35 U.S.C. 154(b) by 0 days.

This patent is subject to a terminal disclaimer.

(21) Appl. No.: 11/353,852

(22) Filed: Feb. 13, 2006

(65) Prior Publication Data

US 2006/0124809 A1    Jun. 15, 2006

Related U.S. Application Data

(62) Division of application No. 10/671,241, filed on Sep. 24, 2003, now Pat. No. 7,048,240.

(51) Int. Cl.
*A47B 91/00* (2006.01)

(52) U.S. Cl. .................. 248/188.91; 248/188

(58) Field of Classification Search ............. 248/163.1, 248/188, 187.1, 188.5, 161, 157, 436, 440, 248/188.1, 188.91, 163.2, 158, 432, 346.07; 211/203, 196, 205, 175; 396/419, 427, 422, 396/420

See application file for complete search history.

(56) References Cited

U.S. PATENT DOCUMENTS

| 1,598,943 | A | * | 9/1926 | Tessier | 248/188 |
| 1,888,600 | A | * | 11/1932 | Luder | 362/346 |
| 2,483,463 | A | * | 10/1949 | Jeffries et al. | 116/63 P |
| 3,168,789 | A | * | 2/1965 | Gednalske | 43/19.2 |
| 3,586,852 | A | * | 6/1971 | Bradley | 362/280 |
| 3,736,058 | A | * | 5/1973 | Iadarola | 356/4.08 |
| 3,783,262 | A | * | 1/1974 | Pile | 362/184 |
| 3,790,277 | A | * | 2/1974 | Hogan | 356/139.06 |
| 3,865,491 | A | * | 2/1975 | Hogan | 356/139.06 |
| 4,215,839 | A | * | 8/1980 | Gibran | 248/170 |
| 4,240,603 | A | * | 12/1980 | Chiariello | 248/125.9 |
| 4,492,354 | A | * | 1/1985 | Rice | 248/163.1 |
| 4,955,714 | A | * | 9/1990 | Stotler et al. | 353/62 |
| 5,060,894 | A | * | 10/1991 | Hillinger | 248/170 |
| D324,584 | S | * | 3/1992 | Beavers et al. | D26/140 |
| 5,155,667 | A | * | 10/1992 | Ho | 362/190 |
| 5,319,365 | A | * | 6/1994 | Hillinger | 340/908.1 |
| 5,425,526 | A | * | 6/1995 | Shen | 248/636 |
| 5,428,520 | A | * | 6/1995 | Skief | 362/427 |
| 5,449,138 | A | * | 9/1995 | Ciancio | 248/123.2 |

(Continued)

*Primary Examiner*—A. Joseph Wujciak, III
(74) *Attorney, Agent, or Firm*—Risto A. Rinne, Jr.

(57) ABSTRACT

An apparatus that is adapted to reduce wobble in a tripod that is used to hold an optical instrument, includes a triangular shaped base plate that includes an attachment to each leg of the tripod. The base plate includes slots at each corner or apex thereof that provides for an adjustment range sufficient for most types of tripods. A member that is attached to each leg of the tripod is attached to each corner of the base plate. A lighted carousel that includes a battery operated light and is adapted to hold a plurality of lenses is disposed above the base plate. According to a modification, the slots are eliminated from the base plate and an adjustment bar having a slot therein is attached at one end to a modified base plate and, at a remaining end, to a member that is attached to each of the legs of the tripod.

6 Claims, 2 Drawing Sheets

U.S. PATENT DOCUMENTS

| | | | |
|---|---|---|---|
| 5,729,215 A * | 3/1998 | Jutras | 340/908.1 |
| D442,388 S * | 5/2001 | Zuercher | D6/400 |
| 6,259,373 B1 * | 7/2001 | Ghahramani | 340/815.4 |
| 6,454,228 B1 * | 9/2002 | Bosnakovic | 248/177.1 |
| 6,651,944 B2 * | 11/2003 | Coleman | 248/163.1 |
| 6,820,844 B2 * | 11/2004 | Tiffen et al. | 248/168 |
| 7,048,240 B2 * | 5/2006 | Coleman | 248/163.1 |

* cited by examiner

TRIPOD STABILIZER AND LIGHTED LENS CAROUSEL

This application is a divisional of continuation application Ser. No. 10/671,241, filed Sep. 24, 2003 which is now U.S. Pat. No. 7,048,240.

BACKGROUND OF THE INVENTION

1. Field of the Invention

The present invention, in general, relates to tripods and, more particularly, to devices that attach to and stabilize a tripod for a telescope and which support lenses.

Amateur astronomers have telescopes that are supported by a tripod. This is well known in the arts. Similarly, the benefits of an equatorial mount or of a motor drive for use in concert with a tripod are also well known in the astronomical arts. Basically tripods both steady and orient the telescope while motor drive mechanisms are used to assist in the tracking of celestial objects.

A variety of sizes, types, and configurations of tripods currently exist as offered by the various manufacturers, but virtually all telescopes work best for astronomical viewing when they are used in conjunction with a tripod.

As anyone who has ever used an astronomical telescope knows, it is important that it be steady. Even a small amount of wobble is annoying when the magnification ratios multiply its apparent effect.

Even the best tripods are not steady enough. Every astronomer wishes that the tripod supported the telescope in a more steady fashion.

There is another problem all astronomers face and that is one of lens selection. This problem is indeed vexing because it is not possible to use just one lens when viewing. Different lenses provide all manner of enhanced benefits in viewing. These benefits provide variations in magnification, clarity of detail, revelation of color detail, filtering, and field of view, just to name a few. The astronomer must often change lenses during viewing.

The problem is that there is simply no way to store lenses for ready identification and quick access while viewing. There is very little light available to even attempt to determine which lens to select.

Furthermore, the lenses are not stored in a safe manner. They can bump into one another and become scratched, thereby degrading their performance.

Astronomical viewing is accomplished at night. That is the only time when dim celestial objects can be seen. The darker the night, the better the conditions are for viewing dim objects, such as nebulae. Unfortunately, pitch black nights do not make it easy for astronomers to change their lenses.

Accordingly, many astronomers carry a small flashlight that they use to ferret out the desired lenses from a container or tray. The movement of the flashlight can interfere with the viewing pleasure of others.

This is because it takes time for eyes to "dark adapt", that is for the pupils to fully dilate. When a nearby viewer notices a flashlight out of the corner of his eye he is inclined to look toward it. If he glances in that direction and a flash of light is carelessly directed toward him, it can instantly cause his pupils to contract.

The pupils of the eye are adapted to instantly contract but it can take several minutes for them to fully dilate. Therefore, the use of flashlights are in some circles frowned upon because they can be directed toward other astronomers.

Even the flashlight itself is something that must be found before it can be used. If it is stored, for example, in the same tray the lenses are placed, there is risk that the fingers of the user can make contact with the glass of a lens while he is "feeling" in the dark for the flashlight. The oils that are on all human skin can degrade the coatings that are on the lenses.

Besides, even flashlights can be misplaced.

How then can astronomers steady their tripod, safely store their lenses so they are not damaged, provide easy access to them, and gently illuminate the lenses for proper selection without annoying other astronomers who are nearby? Up until now there has been no effective solution for any of these problems.

Accordingly there exists today a need for a tripod stabilizer and lighted lens carousel that helps to overcome these difficulties.

Clearly, such an apparatus would be a useful and desirable device.

2. Description of Prior Art

Tripod supports and the like are, in general, known. For example, the following patents describe various types of these devices:

U.S. Pat. No. 4,826,187 to Abbott et al., May 2, 1989;
U.S. Pat. No. 4,542,909 to Littwin et al., Sep. 24, 1985;
U.S. Pat. No. 3,863,945 to Dunstan, Feb. 4, 1975;
U.S. Pat. No. 3,826,513 to Wolf, Jul. 30, 1974;
U.S. Pat. No. 3,166,028 to Lagel, Jan. 19, 1955;
U.S. Pat. No. 2,453,817 to Shalkhauser, Nov. 16, 1948; and
U.S. Pat. No. 2,092,690 to Baldwin, Sep. 7, 1937.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND STORY OF THE INVENTION

It is an object of the present invention to provide a tripod stabilizer and lighted lens carousel that is useful in stabilizing a tripod.

It is also an important object of the invention to provide a tripod stabilizer and lighted lens carousel that is adaptable for use with a tripod that supports an astronomical telescope.

Another object of the invention is to provide a tripod stabilizer and lighted lens carousel that can safely support a lens.

Still another object of the invention is to provide a tripod stabilizer and lighted lens carousel that can safely support a plurality of lenses.

Still yet another object of the invention is to provide a tripod stabilizer and lighted lens carousel that provides a plate to stabilize a tripod to which a carousel that is adapted to support a plurality of lenses is attached above the plate.

Yet another important object of the invention is to provide a tripod stabilizer and lighted lens carousel that provides a plate to stabilize a tripod to which a carousel that is adapted to support a plurality of lenses is attached below the plate.

Still yet another important object of the invention is to provide a tripod stabilizer and lighted lens carousel that includes a carousel for supporting a plurality of lenses, the carousel being disposed intermediate the legs of a tripod.

Still yet one further important object of the invention is to provide a tripod stabilizer and lighted lens carousel that includes a carousel for supporting a plurality of lenses, the carousel having a light that is disposed above the lenses, the light being readily accessible and adaptable for turning it on and off as desired and disposed so as to direct its light substantially on the lenses.

Still yet one additional important object of the invention is to provide a tripod stabilizer and lighted lens carousel that includes a carousel for supporting a plurality of lenses, the carousel having a light that is disposed above the lenses, the light being disposed sufficiently far away from the lenses so as to prevent a user from inadvertently contacting the glass portion of any of the lenses while he is attempting to turn the light on.

Briefly, a tripod stabilizer and lighted lens carousel that is constructed in accordance with the principles of the present invention has a triangular stabilizer plate that is disposed intermediate the three tripod legs to which it is attached and provides added stability. An adjustable, telescoping post is attached to the plate and used to support a carousel at a preferred elevation above the ground. A bearing allows the carousel to rotate in a continuous circular motion about a center longitudinal axis of the telescoping post. The carousel includes a tray that has a plurality of openings therein that are each adapted to receive a lens. A bracket supports a battery operated light that is disposed above the tray. According to a preferred embodiment, the carousel is disposed above the plate. According to an alternate embodiment, the carousel is disposed below the plate.

DETAILED DESCRIPTION OF THE INVENTION

Figure 1:
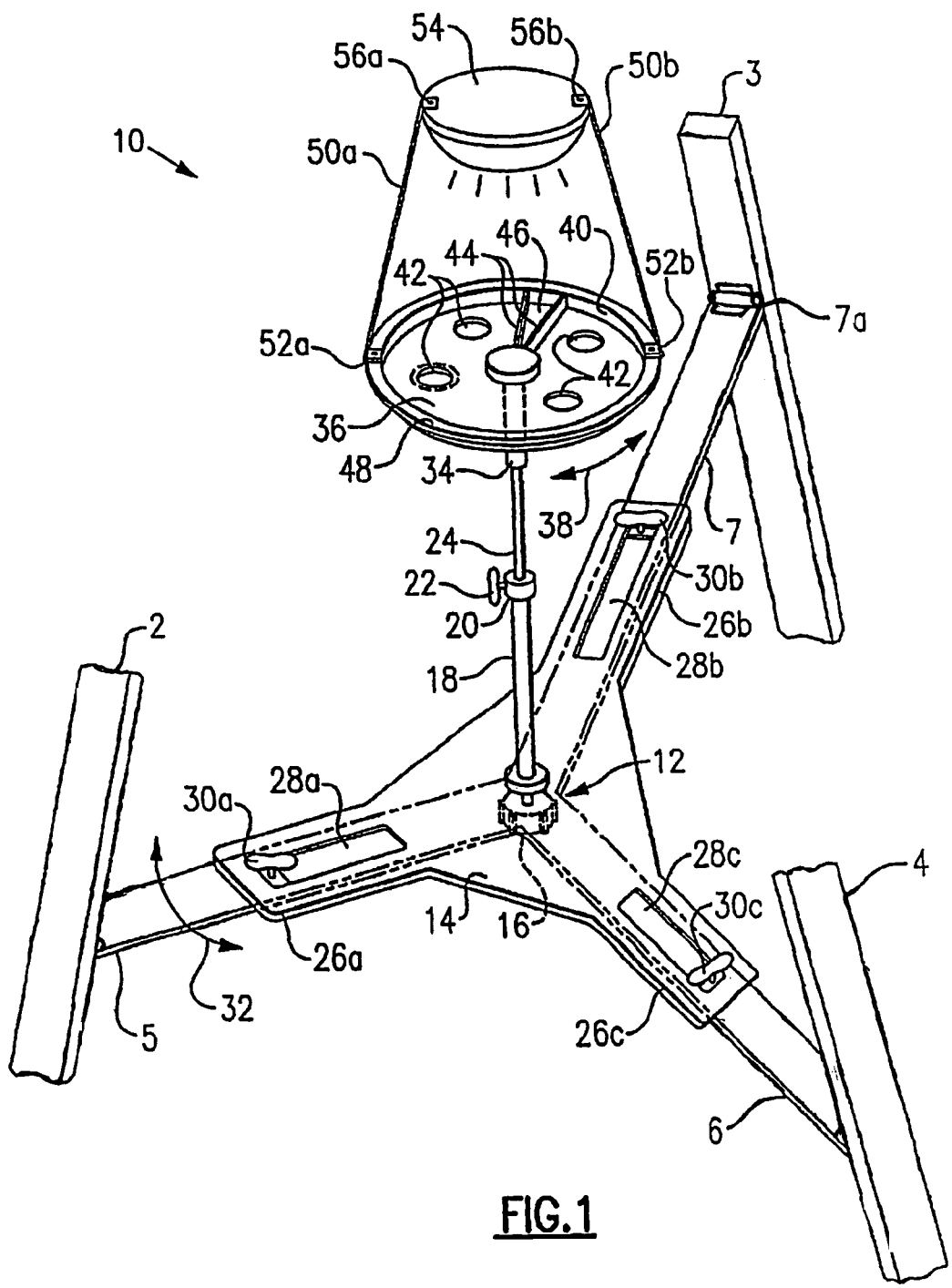
FIG. 1 is a view in perspective of a tripod stabilizer and lighted lens carousel.

Referring primarily now to FIG. 1 is shown, a tripod stabilizer and lighted lens carousel, identified in general by the reference numeral 10 and hereinafter referred to as "the carousel 10".

Three tripod legs, identified by the reference numerals 2, 3, 4 are shown in dashed lines and the carousel 10 is disposed in the middle of the three tripod legs 2, 3, 4.

Most tripods also have a tripod leg support bracket, identified by the reference numerals 5, 6, 7 that are each hingedly attached to one of the three tripod legs 2, 3, 4. The axis of hinge attachment is shown on one of the tripod leg support brackets 7 and is identified by reference numeral 7a.

The tripod legs 2, 3, 4 and the tripod leg support brackets 5, 6, 7 are known existing types of devices.

The tripod leg support brackets 5, 6, 7, in use, typically extend to a central point, identified in general by the reference numeral 12.

In prior art designs, even if the tripod leg support brackets 5, 6, 7 are allowed to meet in the central point 12, they are attached together by a bolt and a nut (not shown) and are still able to pivot from side to side.

Therefore, the support they provided to further stabilize the tripod legs 2, 3, 4 is minimal. The tripod leg support brackets 5, 6, 7, if used as intended, keep the tripod legs 2, 3, 4 from opening up but they do not further steady the tripod legs 2, 3, 4 themselves.

According to the instant disclosure, the tripod leg support brackets 5, 6, 7 still extend to the central point 12 where they are fastened together and to the center of a triangular plate 14 by the use of a threaded knurled knob 16 (shown in dashed lines).

The knurled knob 16 passes through a central hole in the triangular plate 14 and enters into the bottom of a first post 18, into which it is threaded and tightened by hand.

This secures the tripod leg support brackets 5, 6, 7 at the central point 12 to each other and to the triangular plate 14 and it also secures the first post 18 in an upright manner perpendicular with respect to the plane of the triangular plate 14.

A collar 20 is attached proximate the top of the first post 18 and a wing nut 22 is threaded to the collar 20 and, when tightened, bears upon a second post 24 that is disposed in the first post 18.

The second post 24 and the first post 18 share the same longitudinal axis. The outside diameter of the second post 24 is less than the inside diameter of the first post 18. Therefore, the second post 24 is adapted to extend longitudinally with respect to the first post 18.

The wing nut 22 is loosened and the second post 24 is extended as desired to optimally position the carousel 10 for use, as is described in greater detail hereinafter. The wing nut 22 is then tightened to secure the second post 24 where desired.

Once secured, both the first post 18 and the second post 24 are fixed in position relative to the triangular plate 14.

Only a portion of each of the tripod legs 2, 3, 4 are shown. They each extend downward to the ground and upward to a central area to which is included (i.e., attached) the necessary mountings to facilitate attachment of an astronomical telescope (not shown) and any other equipment, such as a motor drive (not shown). These are well known in the arts and are not shown.

At each of the corners of the triangular plate 14 is included an elongated portion 26a, 26b, 26c, each of which includes a slot 28a, 28b, 28c therein. Each slot 28a, 28b, 28c includes a longitudinal center axis that, if extended inward, passes through the central point 12 and, if extended outward, passes through the center of one of the tripod legs 2, 3, 4.

A wing mounting nut 30a, 30b, 30c each passes through one of the slots 28a-c and also through one of the tripod leg support brackets 5, 6, 7 and is tightened.

The slots 28a-c allow for a sufficient range of adjustment in the positioning of the wing mounting nuts 30a-c along the longitudinal axis of the slots 28a-c so that the wing mounting nuts 30a-c will each be able to pass through one of the holes provided in virtually all of the common types of the tripod leg support brackets 5, 6, 7 that are currently available.

The ability to tighten each of the tripod leg support brackets 5, 6, 7 to the triangular plate 14 at both the central point 12 and also at a location that is disposed away from the central point 12 (i.e., in the slot 28a-c of the elongated portions 26a, 26b; 26c) firmly secures each of the tripod leg support brackets 5, 6, 7 to the triangular plate 12.

Accordingly, the tripod leg support brackets 5, 6, 7 are detachably-attachable with respect to the triangular plate 14.

Not only are the tripod legs 2, 3, 4 prevented from movement in or out with respect to the central point 12 but each of the tripod leg support brackets 5, 6, 7 is prevented from experiencing any side to side movement, as is shown by arrow 32.

This configuration greatly increases the stability of the tripod.

The second post 24 extends upward and terminates in a bearing assembly 34 that is attached to a carousel tray 36. The carousel tray 36 is adapted to pivot in a circle about the longitudinal axis of the second post 24 as shown by arrow 38.

The carousel tray 36. preferably includes a side lip 40 that extends around its perimeter and a plurality of lens holes 42 of any preferred diameter. The lens holes 42 allow for placing a lens (not shown) in through the lens holes 42.

Each lens is placed into one of the lens holes 42 from the top of the carousel tray 36. Each lens naturally has a larger diameter neck that prevents it from fully passing through the carousel tray 36.

Any number of dividers 44 may be used to further partition the carousel tray 36 into smaller compartments 46. The compartments 46 may or may not have any of the lens holes 42 therein. If the lens holes 42 are omitted from any of the compartments 46, small incidental items (not shown) may be stored there for ready access, as is described in greater detail hereinafter.

Attached to a rim 48 that extends around the side lip 40 are attached a pair of brackets 50a, 50b by the use of a pair of machine screws and nuts 52a, 52b.

The brackets 50a, 50b extend upward and inwards and are attached to a battery powered light 54 by the use of a pair, of screws 56a, 56b. The brackets 50a, 50b provide a frame for supporting the light 54 above the carousel tray 36.

The battery powered light 54 includes a soft diffuser lens 58 attached thereto. To turn the light 54 on, the diffuser lens 58 is pressed upward. To turn the light 54 off, the diffuser lens 58 is again pressed upward.

The light 54 is a well known type of commercially available product that uses four "AA" size batteries and which casts a soft light that does not excessively hamper night vision (i.e., it does not cause the pupils of the user or others nearby to excessively contract).

It gently illuminates all objects that are placed in the carousel tray 36 for ready identification and easy selection. As the carousel tray 36 rotates and is adjustable to the preferred height, a convenient way to steady the tripod and to display the lenses is provided during astronomical viewing.

Figure 2:
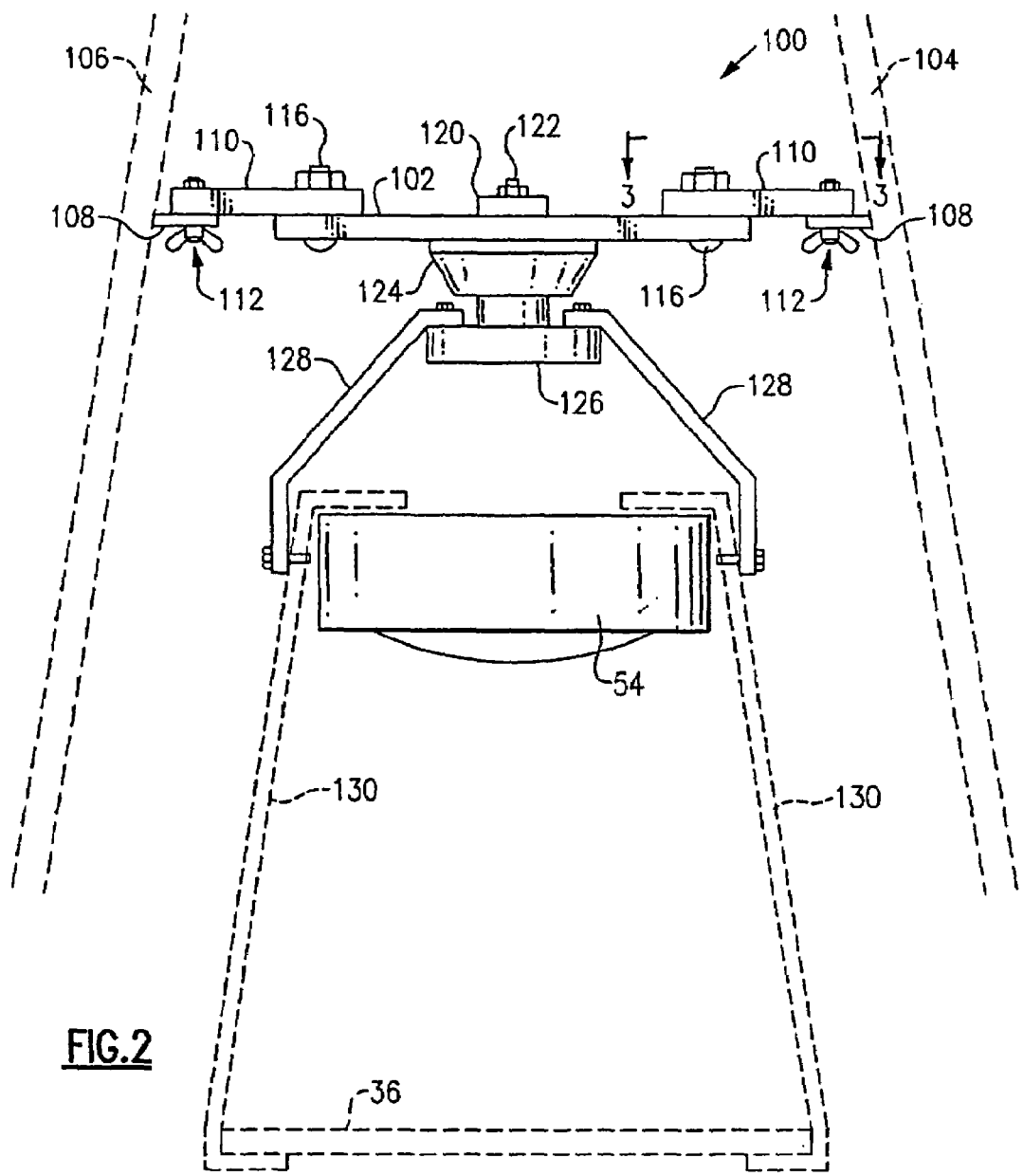
FIG. 2 is a side view of a modified tripod stabilizer and lighted lens carousel.
Figure 3:
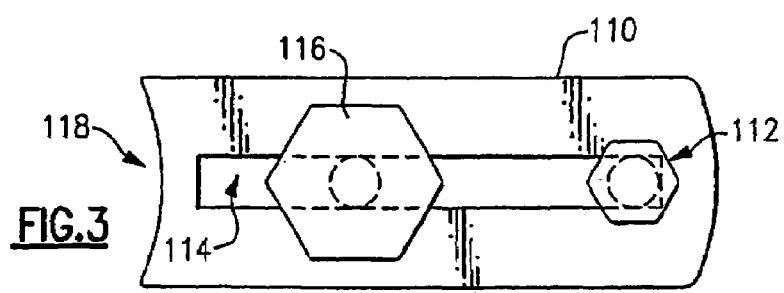
FIG. 3 is a top view of an adjustment bar as shown in FIG. 2 and as seen along the lines 3-3 therein.

Referring now also to FIGS. 2 and 3, there are a few specialty tripods that are commercially available that do not have the tripod leg support brackets 5, 6, 7. Accordingly, a modified carousel 100 is provided for such instances.

The modified carousel 100 includes a smaller modified triangular plate 102. Two (of three) modified tripod legs 104, 106 are shown in dashed lines.

The three modified tripod legs 104, 106 each include a member 108 that is attached thereto and which includes a hole therein. The members 108 are normally supplied by the manufacturer of the specialty tripod.

An adjustment bar 110 is attached at one end thereof to each of the members 108 by a bolt and wing nut, identified in general by the reference numeral 112.

Each of the adjustment bars 110 includes an elongated slot 114. An adjustment bolt and nut 116 are used to tighten each of the adjustment bars 110 to the modified triangular plate 102.

The inside of each of the adjustment bars 110 includes a radius, identified in general by the reference numeral 118. The radius permits placement of the adjustment bars 110 as close to a bearing 120 that is secured to the center of modified triangular plate 102 by a center bolt 122 as may be required.

The center bolt 122 passes through a bezel 124 and secures a rotating arbor 126 in position. The rotating arbor 126 is adapted to pivot in a circle about the center bolt 122.

The rotating arbor 126 includes bracketry 128 attached thereto. The bracketry 128 is attached to a modified light frame 130 shown in dashed lines. The modified light frame 130 is used to support the light 54 above the carousel tray 36 (also shown in dashed lines).

Accordingly, the carousel tray 36 is suspended below the modified triangular plate 102 where it is adapted to rotate in a circle, as desired.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A tripod stabilizer for stabilizing legs of a tripod that pivot inward for transport and which pivot outward for stability during use, comprising:

(a) a stabilizing plate, said stabilizing plate being formed of a substantially rigid material and including a shape that is planar, and including a plane that passes through a geometric center of said stabilizing plate;

(b) means for attaching said stabilizing plate to a first leg, a second leg, and a third leg of a tripod; and (c) wherein said means for attaching said stabilizing plate includes means for attaching a first portion of said stabilizing plate to a first member, said first member being attached to said first leg of said tripod at a location that is between a pair of opposite ends of said first leg, and wherein said first member is not capable of pivoting with respect to said first leg and wherein said first member is not capable of pivoting with respect to said stabilizing plate when said first portion of said stabilizing plate is attached to said first member, and wherein said first member is detachably-attachable with respect to said first portion of said stabilizing plate, and wherein when said first member is attached to said first portion of said stabilizing plate, said first member extends away from said first portion of said stabilizing plate in a direction that is generally toward said first leg and wherein a first elevational angle is formed between a longitudinal center of said first member and said plane of said stabilizing plate and wherein said first elevational angle is constant and cannot vary, and wherein said stabilizing plate and said first member are adapted to prevent said first leg from being displaced either further away from or closer with respect to said second leg and said third leg, and wherein said means for attaching said stabilizing plate includes means for attaching a second portion of said stabilizing plate to a second member, said second member being attached to said second leg of said tripod at a location that is between a pair of opposite ends of said second leg, and wherein said second member is not capable of pivoting with respect to said second leg and wherein said second member is not capable of pivoting with respect to said stabilizing plate when said second portion of said stabilizing plate is attached to said second member, and wherein said second member is detachably-attachable with respect to said second portion of said stabilizing plate, and wherein when said second member is attached to said second portion of said stabilizing plate, said second member extends away from said second portion of said stabilizing plate in a direction that is generally toward said second leg and wherein a second elevational angle is formed between a longitudinal center of said second member and said plane of said stabilizing plate and wherein said second elevational angle is constant and cannot vary, and wherein said stabilizing plate and said second member are adapted to prevent said second leg from being displaced either further away from or closer with respect to said first leg and said third leg, and wherein said means for attaching said stabilizing plate includes means for attaching a third portion of said stabilizing plate to a third member, said third member being attached to said third leg of said tripod at a location that is between a pair of opposite ends of said third leg, and wherein said third member is not capable of pivoting with respect to said third leg and wherein said third member is not capable of pivoting with respect to said stabilizing plate when said third portion of said stabilizing plate is attached to said third member, and wherein said third member is detachably-attachable with respect to said third portion of said stabilizing plate, and wherein when said third member is attached to said third portion of said stabilizing plate, said third member extends away from said third portion of said stabilizing plate in a direction that is generally toward said third leg and wherein a third elevational angle is formed between a longitudinal center of said third member and said plane of said stabilizing plate and wherein said third elevational angle is constant and cannot vary, and wherein said stabilizing plate and said third member are adapted to prevent said third leg from being displaced either further away from or closer with respect to said first leg and said second leg and wherein no portion of said stabilizing plate is adapted to contact a surface upon which said first leg, said second leg, and said third leg of said tripod are placed, and wherein when said first leg, said second leg, and said third leg of said tripod have been pivoted outward and disposed in a position for use and said tripod stabilizer is attached to said first leg and to said second leg and to said third leg, said first leg and said second leg and said third leg are from prevented from pivoting with respect to each other.

2. The tripod stabilizer of claim 1 including means for attaching a first end of said first member at a location that is disposed proximate the center of said stabilizing plate, whereby said attachment of said first member to said stabilizer plate at said center and at said first portion is adapted to reduce a potential for wobble occurring in said first leg of said tripod.

3. The tripod stabilizer of claim 1 wherein said stabilizing plate is substantially triangular in shape.

4. The tripod stabilizer of claim 3 wherein said first portion includes a corner portion of said stabilizing plate that is substantially triangular in shape.

5. A tripod stabilizer for stabilizing legs of a tripod that pivot inward for transport and which pivot outward for stability during use, comprising:
(a) a stabilizing plate, said stabilizing plate being formed of a substantially rigid material and including a shape that is planar, and including a plane that passes through a geometric center of said stabilizing plate; and
(b) said stabilizing plate having three ends, each of said three ends including an opening therethrough, and wherein a first of said three ends is adapted for securing a first end of a first member thereto and wherein an opposite second end of said first member is attached to a first leg of said tripod at a location that is between a pair of opposite ends of said first leg of said tripod and wherein when said first member is attached to said first of said three ends there is no pivoting that can occur at any time by said first member with respect to said plane, and wherein when said first member is attached to said first of said three ends and to said first leg said first member is not capable of pivoting with respect to said first leg, and wherein said stabilizing plate is adapted to prevent said first leg from being displaced either further away from or closer with respect to a second leg and a third leg of said tripod; and wherein a second of said three ends is adapted for securing a first end of a second member thereto and wherein an opposite second end of said second member is attached to said second leg of said tripod at a location that is between a pair of opposite ends of said second leg of said tripod and wherein when said second member is attached to said second of said three ends there is no pivoting that can occur at any time by said second member with respect to said plane, and wherein when said second member is attached to said second of said three ends and to said second leg said second member is not capable of pivoting with respect to said second leg, and wherein said stabilizing plate is adapted to prevent said second leg from being displaced either further away from or closer with respect to said first leg and said third leg of said tripod; and wherein a third of said three ends is adapted for securing a first end of a third member thereto and wherein an opposite second end of said third member is attached to said third leg of said tripod at a location that is between a pair of opposite ends of said third leg of said tripod and wherein when said third member is attached to said third of said three ends there is no pivoting that can occur at any time by said third member with respect to said plane, and wherein when said third member is attached to said third of said three ends and to said third leg said third member is not capable of pivoting with respect to said third leg, and wherein said stabilizing plate is adapted to prevent said third leg from being displaced either further away from or closer with respect to said first leg and said second leg of said tripod, and wherein no portion of said stabilizing plate is adapted to contact a surface upon which said tripod is placed, and wherein when said first leg, said second leg, and said third leg of said tripod have been pivoted outward and disposed in a position for use and said tripod stabilizer is attached to said first leg and to said second leg and to said third leg, said first leg and said second leg and said third leg are from prevented from pivoting with respect to each other.

6. The tripod stabilizer of claim 5 wherein said plate is substantially triangular in shape.

* * * * *